United States Patent [19]

Sato

[11] Patent Number: 5,076,677
[45] Date of Patent: Dec. 31, 1991

[54] ZOOM LENS
[75] Inventor: Haruo Sato, Kawaguchi, Japan
[73] Assignee: Nikon Corporation, Tokyo, Japan
[21] Appl. No.: 646,492
[22] Filed: Jan. 28, 1991

Related U.S. Application Data

[63] Continuation of Ser. No. 325,924, Mar. 20, 1989, abandoned.

[30] Foreign Application Priority Data

Mar. 22, 1988 [JP] Japan ................................. 63-67517

[51] Int. Cl.$^5$ ............................................. G02B 15/00
[52] U.S. Cl. ................................. 359/680; 359/691; 359/708
[58] Field of Search ................. 350/426, 432, 427, 423

[56] References Cited

U.S. PATENT DOCUMENTS 4,367,927 1/1983 Fujii ................................... 350/426

FOREIGN PATENT DOCUMENTS 54-23555 2/1979 Japan .
58-121011 7/1983 Japan .
62-94812 1/1987 Japan .
62-177514 4/1987 Japan .

*Primary Examiner*—Paul M. Dzierzynski
*Attorney, Agent, or Firm*—Shapiro and Shapiro

[57] ABSTRACT

A two-group zoom lens includes a first lens group having a negative refractive power, and a second lens group having a positive refractive power, zooming being effected with the spacing between the first lens group and the second lens group being relatively varied. The first lens group comprises, in succession from the object side, a first lens component having a negative refractive power, a second lens component having a negative refractive power and having an aspherical shape in which the negative refractive power becomes weaker toward the marginal portion, and a third lens component having a positive refractive power. The zoom lens satisfies the following condition:

$$0.052 < \frac{|As - s|f_1}{fw \cdot fL_1} < 0.2$$

where $|As-s|$ is the difference in the direction of the optic axis between the aspherical surface of the second lens component on the most marginal edge of the effective diameter thereof and a reference spherical surface having a predetermined vertex radius of curvature, $f_1$ is the focal length of the first lens group, fw is the focal length of the entire system at the wide angle end, and $f_{L1}$ is the focal length of the first lens component.

18 Claims, 2 Drawing Sheets

ZOOM LENS

This is a continuation of application Ser. No. 325,924 filed Mar. 20, 1989, now abandoned.

BACKGROUND OF THE INVENTION

1. Field of the Invention

This invention relates to a zoom lens for a camera, and in particular to a compact zoom lens of two-group construction chiefly for a 35 mm format single-lens reflex camera.

2. Related Background Art

There have heretofore been provided numerous two-group zoom lenses, i.e., a first lens group having a negative refractive power and a second lens group having a positive refractive power, and effecting a magnification change by the spacing therebetween being varied. Many of these two-group zoom lenses have a zoom ratio of twice or less, but some zoom lenses in which a wide angle, a high magnification (a high zoom ratio) and compactness are achieved have also been proposed.

For example, in Japanese Laid-Open Patent Application No. 62-177514, there is proposed a wide angle two-group zoom lens in which the first lens group having a negative refractive power is comprised of three spherical lenses and which has a relatively high zoom ratio.

Also, in Japanese Laid-Open Patent Application No. 58-121011, there is disclosed a wide angle two-group zoom lens which adopts a construction in which an aspherical lens is introduced into the first lens group having a negative refractive power and in which a high zoom ratio is achieved and compactness of the first lens group is realized.

Now, generally in a zoom lens of two-group construction, excessive off-axis light flux enters and therefore, the fluctuation of coma by zooming poses a great problem. Therefore, there has also been proposed a zoom lens in which the fluctuation of coma is suppressed by a construction having a flare stop operatively associated with the first lens group in response to zooming.

For example, in Japanese Laid-Open Patent Application No. 54-23555, a flare stop is provided between a first lens group having a negative refractive power and a second lens group having a positive refractive power, whereby the lower coma flare of the intermediate portion of the picture plane is effectively intercepted without causing deficiency of the quantity of marginal light and not only the fluctuation of lower coma by zooming, but also the fluctuation of coma by the angle of view is suppressed to realize an improved performance.

Also, in Japanese Laid-Open Patent Application No. 62-94812, the off-axis light ray is greatly refracted by the strong refractive power of a negative lens having its concave surface facing the image side in a second lens group having a positive refractive power and upper coma occurs and therefore, the upper coma particularly on the telephoto side is effectively intercepted by a flare stop provided at the image side of the second lens group, thereby achieving an improved performance.

Numerous efforts have been made in the known techniques as described above, but the following problems are involved therein.

In Japanese Laid-Open Patent Application No. 62-177514, distortion cannot be completely corrected by a first lens group comprised of three spherical lenses, and at the wide angle end, lower coma by color occurs greatly and further, in the medium focal length state, upper coma is over-corrected, and this is not preferable. Also, a second lens group having a positive refractive power is basically of a construction in which the refractive power is strong and therefore, correction of Petzval sum becomes difficult, and this leads to the disadvantage that the balance with astigmatism, curvature of image field and spherical aberration particularly at the telephoto end is bad.

In the zoom lens of Japanese Laid-Open Patent Application No. 58-121011, a first lens group is comprised of four lenses and therefore, the thickness of this group becomes great, and this is not preferable. Also, correction for the lower coma of the first lens group is not good and particularly, at the wide angle end, the fluctuation of lower coma by the angle of view and the lower coma by color are great and further, upper coma is over-corrected over the entire range from the wide angle end to the telephoto end.

In the zoom lens of Japanese Laid-Open Patent Application No. 54-23555, there is adopted a construction in which a wide spacing is secured between a first lens group and a second lens group to enable the flare stop as previously described to be provided, and this leads to the increased diameter of the foremost lens of the first group. Further, if the diameter of this flare stop is varied in response to zooming, it will result in the complication of the structure of the lens barrel, which in turn leads to an increased cost, and this is not preferable. Also, due to the construction in which the refractive powers in the first lens group and the second lens group are basically weak, it is difficult to obtain a compact zoom lens having a high zoom ratio.

Further, in Japanese Laid-Open Patent Application No. 62-94812, the zoom ratio is small and, as compared with the fluctuation of lower coma by zooming and the incident light flux incident on the marginal portion of the picture plane, correction of the lower coma flare, etc. of the intermediate portion of the picture plane caused by an excessive light flux entering into the intermediate portion of the picture plane is not effected, and this is not preferable.

SUMMARY OF THE INVENTION

Accordingly, the present invention has as an object to solve the above-noted disadvantages peculiar to the known zoom lenses and to provide a compact two-group zoom lens of high performance which enables a wide angle and a high zoom ratio to be achieved and maintains a very good imaging performance over the wide angle to the telephoto and whose cost can be reduced.

The zoom lens according to the present invention is a two-group zoom lens having a first lens group having a negative power and a second lens group having a positive refractive power, zooming being effected with the spacing between the first lens group and the second lens group being relatively varied, characterized in that the first lens group is comprised, in succession from the object side, of a first lens component having a negative refractive power, a second lens component having a negative refractive power, and the zoom lens is constructed so as to satisfy the following condition:

$$0.052 < \frac{|As - s|f_1}{fw \cdot f_{L1}} < 0.2$$

where $|As-s|$ is the difference in the direction of the optic axis between an aspherical surface of the second lens component on the most marginal edge of the effective diameter thereof and a reference spherical surface having a predetermined vertex radius of curvature, $f_1$ is the focal length of the entire system at the wide angle end, and $f_{L1}$ is the focal length of the first lens component.

Also, it is desirable to construct the zoom lens so that the zoom ratio fT/fw satisfies the following condition:

$$2.2 \leq fT/fw \leq 2.5$$

where fT is the focal length of the entire system at the telephoto end.

Further it is desirable to construct the zoom lens so as to satisfy the following conditions:

$$-2 \leq f_1/fw \leq -1.2$$

$$1.2 \leq f_2/fw \leq 1.5$$

where $f_2$ is the focal length of the second lens group.

Now, in recent years, realization of a zoom lens in which a wide angle, a high magnification (a high zoom ratio), compactness and reduced cost can be achieved has been desired.

Therefore, if the first lens group in a two-group zoom lens is comprised of a smallest possible number of lenses each having a strong refractive power, it is very difficult to correct at the wide angle end at the same time distortion (a), the fluctuation (b) of lower coma by the angle of view, the fluctuation (c) of lower coma by zooming, the lower coma flare (d) of the intermediate portion of the picture plane occurring due to an excessive light flux coming into the intermediate portion of the picture plane, as compared with the incident light flux incident on the marginal portion of the picture plane, and an aberration such as the so-called lower coma by color in which lower coma remains for other color even if the lower coma is corrected for a certain reference color.

However, in the present invention as well, the first lens group is comprised of a smallest possible number of lenses to achieve the compactness of this first lens group. Therefore, in the present invention, the following countermeasures are adopted.

First, according to the present invention, the first lens group G2 is comprised, in succession from the object side, of a first lens component L1 having a negative refractive power, and a second lens component L2 having a negative refractive power, and a third lens component L3 having a positive refractive power and therefore, the first lens group G1 can be made into a construction which is basically advantageous for making this lens group thin.

Further, the present invention adopts a construction in which the refractive power of the first lens component L1 is basically strengthened in order to cause much of the oblique light ray of a wide angle of view to enter and thereby solve the problem of a reduced quantity of marginal light and to make the effective diameter of the first lens component L1.

However, as the refractive power of the first lens component L1 becomes greater, negative distortion (a) occurs particularly more remarkably, and if the diameter of the foremost lens is made small, correction of particularly the fluctuation (c) of lower coma by zooming will become very difficult.

Therefore, to correct this negative distortion (a), a positive lens may be disposed at the object side of the negative first lens component L1, but the first lens group G1 becomes thick and the effective diameter of the first lens component L1 becomes great, thus resulting in bulkiness and increased cost of the lens system, and this is not preferable.

So, in order to correct this negative distortion (a), in the present invention, the negative second lens component L2 is formed into an aspherical shape in which the negative refractive power becomes weaker toward the marginal portion. That is, it is formed into an aspherical shape in which the difference $|As-s|$ in the direction of the optic axis between the aspherical surface of the second lens component L2 at the most marginal edge of the effective diameter thereof and a reference spherical surface having a predetermined vertical radius of curvature (hereinafter referred to as the "deviation") becomes greater. By this aspherical construction, the negative distortion (a) can be corrected well and also both of the fluctuation (b) of lower coma by the angle of view and the fluctuation (c) of lower coma by zooming can be corrected with very good balance.

It is very advantageous in terms of performance and cost to introduce an aspherical surface into the second lens component L2, as described above.

If an aspherical surface is introduced into the first lens component L1, the diameter of the first lens component L1 which is an aspherical lens will become great, and this will necessarily result in an increased cost. Also, if as in the present invention, the first lens component L1 is endowed with a strong refractive power, problems in the manufacture will arise and particularly, in respect of the eccentricity and surface accuracy of the aspherical surface, the manufacture will become remarkably difficult. Furthermore, if for the purpose of inexpensive manufacture, a plastic material is used for the aspherical lens of the first lens component L1, the first surface thereof which is in contact with the atmosphere will be liable to be damaged, and this is not preferable. On the other hand, it is not preferable in respect of improved performance which is one of the objects of the present invention to introduce an aspherical surface into the third lens component L3, and it is particularly disadvantageous in correction of distortion.

Further objects, features and effects of the present invention will become fully apparent from the following detailed description taken in conjunction with the accompanying drawings.

DESCRIPTION OF THE PREFERRED EMBODIMENTS

An embodiment of the present invention will hereinafter be described with reference to the drawings.

Figure 1:
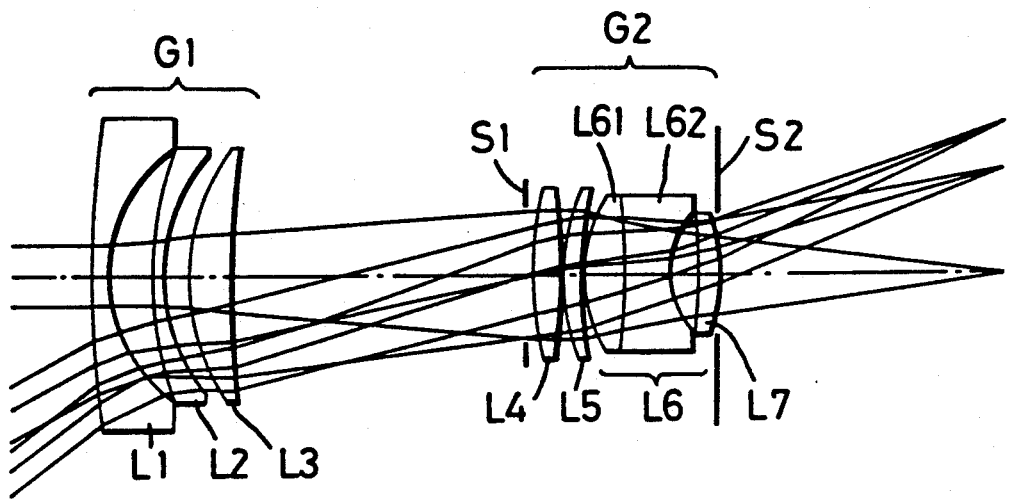
FIG. 1 is a construction view of an optical system showing the lens construction and optical path of an embodiment of the present invention.

Referring to FIG. 1, a first lens group G1 which is a forward group having a negative refractive power comprises, in succession from the object side, a first lens component L1 of a meniscus shape having its convex surface facing the object side and having a negative refractive power, a second lens component L2 of a meniscus shape having its convex surface facing the object side and having a negative refractive power and having an aspherical shape in which the negative refractive power becomes weaker toward the marginal portion, and a third lens component L3 of a meniscus shape having its convex surface facing the object side and having a positive refractive power, and a second lens group G2 which is a rearward group having a positive refractive power comprises, in succession from the object side, a fourth lens component L4 and a fifth lens component L5 having a positive refractive power, a sixth lens component L6 comprising two lenses having their convex surfaces facing the object side and having refractive powers of different signs and cemented together and having a negative refractive power as a whole, and a seventh lens component L7 having its convex surface facing the image side and having a positive refractive power.

Further, an aperture stop S1 is provided at that side of the second lens group G2 which is adjacent to the object side, and a flare stop S2 having the function of removing a flare component is disposed at that side of the second lens group G2 which is adjacent to the image side, and the aperture stop S1 and the flare stop S2 are designed to be moved relative to each other along the optic axis with zooming.

Figure 3:
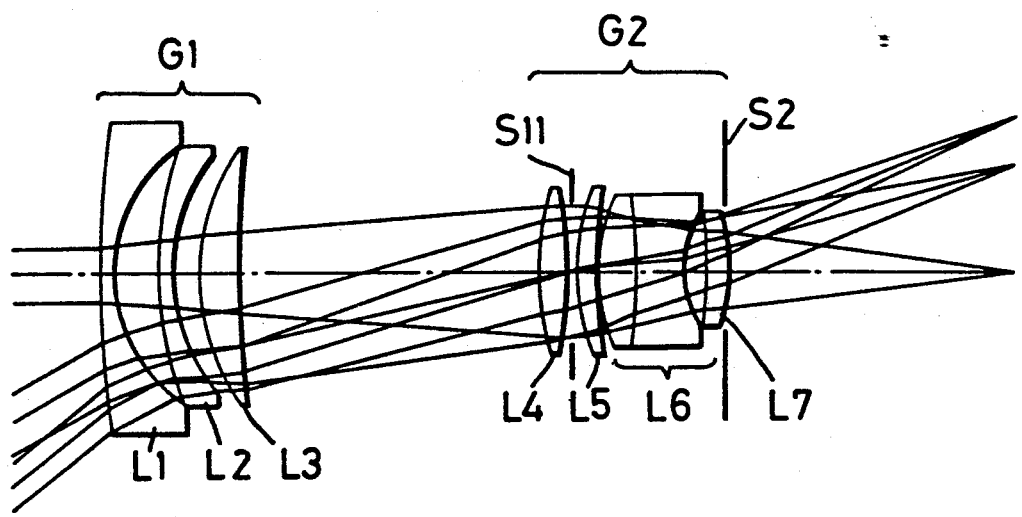
FIG. 3 illustrates the optical path when in the lens construction shown in FIG. 1, an aperture stop is provided in a second lens group.

Now, FIG. 3 illustrates the optical path when in the lens construction of FIG. 1, the aperture stop is disposed in the second lens group. The embodiment of the present invention which is shown in FIG. 1 will hereinafter be described in contrast with FIG. 3.

First, as seen from FIG. 3, the most marginal light ray from infinity parallel to the optic axis which enters the first lens group G1 diverges by the negative refractive power of the first lens group G1 and therefore, the incidence height of the most marginal light ray which enters the second lens group G2 necessarily becomes high. Since generally in such a two-group zoom lens, the entrance pupil exists in the second lens group G2, the off-axis lower light flux in the intermediate portion of the picture plane, i.e., the medium angle of view, is necessarily not limited at the position whereat the incidence height of the most marginal light ray is high, but too much of such light flux enters the second lens group. Accordingly, a lens having relatively much lower coma has its imaging performance deteriorated as coma flare (d).

Therefore, to intercept this coma flare (d) effectively, correction can be accomplished also by making the effective diameters of the lenses in the first lens group G1 small, but according to this method, the lower light flux of a maximum angle of view is also intercepted at the same time and the quantity of marginal light becomes deficient. So, to effectively intercept the light flux which causes this coma flare (d), it is necessary to intercept the light flux at a location whereat the incidence height of the most marginal light ray is relatively low.

However, in the zoom lens shown in FIG. 3 which has an aperture stop S11 in the second lens group G2, the effective diameter of the fourth lens component L4 which is a biconvex lens is determined by the F-number at the telephoto end and therefore, the light flux cannot be effectively intercepted by this aperture stop S11.

So, as seen from FIG. 1 which shows the embodiment of the present invention, the present invention adopts a construction in which the aperture stop S1 is disposed near the object side of the second lens group G2, whereby the lower off-axis light flux entering the second lens group G2 is effectively intercepted and therefore, the lower coma flare (d) in the intermediate portion of the angle of view as previously mentioned can be intercepted well to thereby accomplish well-balanced correction.

Accordingly, in the embodiment of FIG. 1, the lower coma flare (d) in the intermediate portion of the angle of view and the lower coma (e) by color can be corrected to the utmost by the lens construction of the first lens group G1 having an aspherical shape and the choice of appropriate lens material and further, such residual aberration which cannot be completely corrected by the first lens group G1 can be intercepted by the aperture stop S1 and corrected with very good balance. That is, the aperture stop S1 functions as a flare stop which effectively intercepts the lower coma flare (d) in the intermediate portion of the angle of view which cannot be completely corrected in the first lens group G1 but remains therein and the coma (e) by color and auxiliarily corrects the aberration. Thus, an improvement in the degree of freedom of aberration correction can be achieved by the construction of this aperture stop S1, and this is advantageous in optical design.

The aperture stop S1 also has the function of correcting at the same time the fluctuation (c) of the coma by the angle of view, particularly, the disadvantage that the lower coma is generally liable to be under-corrected in the medium focal length state to the longest focal length state (telephoto side).

Accordingly, the present invention has a construction in which, over the shortest focal length state (wide angle end) to the longest focal length state (telephoto side), this aperture stop S1 is moved as a unit with the second lens group with zooming to intercept these aberrations effectively and correct them with good balance. It is also possible to adopt a construction in which with zooming, the aperture stop S1 is operatively associated with the second lens group G2 or the diameter of the aperture stop is varied to effectively intercept the aberration by the off-axis and this aberration can be corrected with good balance.

So, if this aperture stop S1 is designed so as to be moved as a unit with the second lens group G2 with zooming, the second lens group G2 and the aperture stop S1 can be constructed so as to be held in a single lens holding cylinder and therefore, designing of the lens barrel is easy and such construction is also advantageous for the tolerance and eccentricity in the manufacture and thus, overall reduced cost can be realized.

Such construction of the aperture stop S1 can lead to the obtaining of numerous advantages, but as the aperture stop S1 is provided more adjacent to the object side of the second lens group G2, the incidence height of the off-axis light ray entering the sixth lens component L6 in the second lens group G2 which has a strong negative refractive power rises farther. Therefore, the height of the offaxis light ray emerging from the image side surface of the sixth lens component L6 which has a sharp curvature also rises and thus, the upper coma occurs remarkably and becomes upper coma flare (f) which tends to aggravate the imaging performance further. So, in the embodiment of FIG. 1, the light ray which causes such aberration to occur is effectively intercepted by the flare stop S2 provided at the image side of the second lens group G2 which will be described later, whereby the aberration is corrected with very good balance.

The second lens group G2 will now be described. In the present invention, to construct the first lens group G1 so that there may be provided a compact and low-cost two-group zoom lens of relatively great zoom ratio, it is necessary to construct the second lens group G2 of a smallest possible number of lenses of strong refractive power to thereby make the second lens group thin.

However, if the second lens group G2, like the first lens group G1, is constructed of a smallest possible number of lenses of strong refractive power, it will become difficult to correct spherical aberration (g) and the fluctuation (h) of spherical aberration caused by zooming. Also, correction of Petzval sum (i) will become difficult and therefore, correction of curvature of image field and astigmatism will become difficult, and as a whole, it will become difficult to correct these aberrations and spherical aberration with good balance. Further, the refractive power of the image side of the negative lens L62 in the second lens group G2 having its concave surface facing the image side will become stronger and therefore, the off-axis light ray passing through the portion of that surface which deviates greatly from the optic axis will be refracted more greatly and thus, upper coma flare (f) by remarkable upper coma will occur.

Therefore, in the embodiment of FIG. 1, the occurrence (g) of this spherical aberration and the fluctuation (h) of the spherical aberration are corrected well by the construction of the fourth lens component L4, the fifth lens component L5 and the sixth lens component L6 which comprises a cemented lens. That is, these aberrations are corrected to the utmost by two positive lens components, i.e., the fourth lens component L4 and the fifth lens component L5, and are auxiliarily corrected by the cemented portion of the sixth lens component L6.

Also, as regards the correction of Petzval sum (i), it is corrected well by this sixth lens component L6. That is, Petzval sum (i) is corrected well by a construction in which the refractive index of the positive lens L61 constituting the sixth lens component L6 is made small and the refractive index of the negative lens L62 is made great.

If a two-group zoom lens is constructed of a small number of lenses, there has heretofore been the tendency that correction of chromatic aberration becomes difficult, but chromatic aberration is also corrected very well by the sixth lens component L6 which is a cemented lens. This sixth lens component L6 is of a preferable construction also in terms of manufacture. That is, the tolerances of the air spaces between the fourth lens component L4, the fifth lens component L5 and the sixth lens component L6 and the tolerances of the center thickness of these lens components are relatively severe, but since the sixth lens component L6 adopts a construction comprising the positive lens L61 and the negative lens L62 cemented together, the manufacture thereof can be made easy. Further, the sixth lens component L6 as a whole has a meniscus shape having its convex surface facing the object side and therefore, the eccentricity tolerance of this lens component L6 becomes loose to make the manufacture thereof easy. Accordingly, a reduced cost can be achieved easily.

Now, the lens disposed in the second lens group G2 of the two-group zoom lens and having its concave surface facing the image side and having a strong negative refractive power is generally constructed so as to have the function of correcting spherical aberration and the function of putting the principal point of the second lens group G2 out toward the object and securing the air space between the first lens group G1 and the second lens group G2. Particularly, a two-group zoom lens having a high zoom ratio must adopt a construction in which the curvature of the image side surface of this negative lens is made great to achieve the zoom ratio. Therefore, as described above, upper coma remarkably occurs on the image side due to the concave surface and as a result, coma flare (f) occurs. Moreover, an attempt to realize a zoom lens of relatively great angle of view will greatly aggravate upper coma and remarkably deteriorate the imaging performance by coma flare (f).

So, in the embodiment of FIG. 1, the sixth lens component L6 corresponding to this negative lens is comprised of a cemented lens comprising the positive lens L61 and the negative lens L62 and therefore, the negative refractive power of the cemented surface is relatively weakened by the lenses being cemented together. Therefore, to enhance the refractive power of the entire sixth lens component L6, it is unavoidable to adopt a construction in which the radius of curvature of the image side surface of this sixth lens component L6 is necessarily made small. This in turn leads to the tendency that upper coma is further aggravated. Also, as described previously, as the aperture stop S1 is provided more adjacent to the object side of the second lens group G2, upper coma tends to occur more remarkably.

Therefore, correction of this upper coma can generally be accomplished by providing a plurality of positive lenses more adjacent to the image side than this negative lens, but the increase in the number of these positive lenses results in an increased cost which is not preferable.

So, a seventh lens component L7 is provided more adjacent to the image side than the sixth lens component L6 and is constructed of a positive lens having its convex surface facing the image side to thereby correct this upper coma to the utmost and further, a flare stop S2 independently movable to the image side relative to the aperture stop S1 along the optic axis with zooming from the wide angle end to the telephoto end is disposed more adjacent to the image side than the second lens group G2 to thereby correct this upper coma very well. By this flare stop S2, it is possible to eliminate coma flare (f) which occurs due to the aggravation of the upper coma particularly from the medium focal length state to the great length state (telephoto end) without causing the deficiency of the quantity of marginal light at the wide angle end, and achieve a marked improvement in the performance.

As described above, according to the present invention, there can be realized a two-group zoom lens in which aberrations are collectively corrected by each group, the aperture stop and the flare stop and the cost can be reduced and the angle of view of the wide angle end is great and which is high in zoom ratio and compact and has a high imaging performance.

Also, to obtain a two-group zoom lens which is high in performance and moreover compact, it is necessary to satisfy the following condition:

$$0.052 < \frac{|A_s - s| f_1}{f_w F_{L1}} < 0.2 \tag{1}$$

were $f_1$ is the focal length of the first lens group G1, $f_{L1}$ is the focal length of the first lens component L1, $f_w$ is the focal length of the entire system at the wide angle end, and $|As-s|$ is the deviation of the aspherical surface of the second lens component L2.

The above condition (1) will hereinafter be described in detail.

To obtain a two-group zoom lens which is high in performance and compact, it is first necessary to make the first lens group G1 thin and thereby make it compact, and make the effective diameter of the first lens component L1 having a negative refractive power small without reducing the quantity of marginal light. This can be achieved by strengthening the refractive power of the first lens component L1. However, if the refractive power in this first lens component L1 becomes stronger, the aberrations occurring in this first lens component L1 will be aggravated and particularly, distortion will occur remarkably. Therefore, the second lens component L2 having a negative refractive power is formed into an aspherical shape in which the shape in which the negative refractive power weakens toward the marginal portion is made sharper, and the effect of this aspherical surface is caused to act strongly to thereby effect negative distortion and correct aberrations very well. That is, by the aspherical construction in which the deviation of the marginal lens portion in the second lens component L2 is made relatively great, the effect of this aspherical surface is utilized to a maximum to correct negative distortion well. Accordingly, the condition (1) prescribes the deviation of the lens as a function relative to the focal length $f_{L1}$ of the first lens component L1 in order to make the first lens group G1 thin and compact and to make the effective diameter of the first lens component L1 small without causing a reduction in the quantity of marginal light.

If the upper limit of the condition (1) is exceeded, the following three cases are conceivable. First, if the deviation $|A_s-s|$ of the aspherical lens becomes great and the focal length $f_{L1}$ of the first lens component L1 becomes small, correction of distortion and compactness of the first lens component L1 are possible, but the angle of view and the fluctuation of lower coma by zooming become great, and it becomes difficult to keep aberrations well balanced. Also, if the deviation $|A_s-s|$ of the aspherical lens becomes very great, distortion can be corrected, but correction of astigmatism and curvature of image field becomes difficult and particularly, aberrations of high orders occur and the aberrations of light rays of a great angle of view are aggravated. Further, if the focal length $f_{L1}$ of the first lens component L1 becomes very small, correction of distortion and correction of the aberrations by the off-axis light flux become difficult.

If conversely, the lower limit of the condition (1) is exceeded, the following three cases are likewise conceivable. First, if the deviation $|A_s-s|$ of the aspherical lens becomes small and the focal length $f_{L1}$ of the first lens component L1 becomes great, distortion can be corrected, but the effective diameter of this first lens component L1 becomes great and this is not preferable in making it compact. Also, if the deviation $|A_s-s|$ of the aspherical lens becomes very small, the effect of correcting the distortion of the aspherical surface is remarkably reduced, and this is not preferable. Further, if the focal length $f_{L1}$ of the first lens component L1 becomes very great, the effective diameter of the first lens component L1 becomes great, and this is not preferable in making it compact.

Further, to obtain a two-group zoom lens of good performance, it is desirable to construct it so that the zoom ratio fT/fw satisfies the following condition:

$$2.2 \leq fT/fw \leq 2.5 \tag{2}$$

where fT is the focal length of the entire system at the telephoto end.

This condition (2) will hereinafter be described in detail.

If the upper limit of the condition (2) is exceeded, it will become difficult to correct aberrations sufficiently and obtain a good performance by the construction of the present invention, and particularly the fluctuations of lower coma, upper coma and spherical aberration by zooming will become remarkably great. If conversely, the lower limit of the condition (2) is exceeded, it will be possible to realize a zoom lens which can provide a sufficiently good performance even if the construction of the present invention is not used, but if the lens of the present invention is constructed so as to satisfy a condition which exceeds this lower limit, an increased cost will result, and this is not preferable.

Also, to construct this zoom lens compactly, it is desirable to satisfy the following conditions (3) and (4)

$$-2 \leq f_1/fw \leq -1.2 \tag{3}$$

$$1.2 \leq f_2/fw \leq 1.5 \tag{4}$$

where $f_2$ is the focal length of the second lens group.

If the upper limit of the condition (3) is exceeded, the refractive power of the first lens group G1 will become too great and the differences by color in distortion, astigmatism and lower coma and the fluctuation of lower coma by zooming cannot be sufficiently corrected and it will become difficult to construct the first lens group G1 of three lenses. If conversely, the lower limit of the condition (3) is exceeded, the refractive power of the first lens group G1 will become too small and the full length thereof will become great and the diameter of the forward lens will become great, and this is not preferable in making the first lens group compact.

If the upper limit of the condition (4) is exceeded, the refractive power of the second lens group G2 will become too small and the amount of zooming movement of this second lens group G2 will increase and the full length thereof will become great, and this is not preferable in making it compact. If conversely, the lower limit of the condition (4) is exceeded, the refractive power of the second lens group will become too great and the construction of the present invention will become insufficient for correction of spherical aberration, and upper coma will be further aggravated and become difficult to correct.

Also, to accomplish sufficient aberration correction, it is further desirable to satisfy the following conditions:

$$0.23 \leq n_{62} - n_{61} \leq 0.4 \quad (5)$$

$$d_{61} < d_{62} \quad (6)$$

$$25 \leq \nu_{61} - \nu_{62} \leq 45 \quad (7)$$

where

- $n_{61}$: the refractive index of the positive lens L61 in the sixth lens component L6 for d-line.
- $n_{62}$: the refractive index of the negative lens L62 in the sixth lens component L6 for d-line.
- $d_{61}$: the center thickness of the positive lens L61 in the sixth lens component L6.
- $d_{62}$: the center thickness of the negative lens L62 in the sixth lens component L6.
- $\nu_{61}$: the Abbe number of the positive lens L61 in the sixth lens component L6.
- $\nu_{62}$: the Abbe number of the negative lens L62 in the sixth lens component L6.

If the upper limit of the condition (5) is exceeded, Petzval sum becomes too great and astigmatism will become great and correction of curvature of image field will become difficult. If conversely, the lower limit of the condition (5) is exceeded, Petzval sum will become too small and astigmatism will become great, and correction of curvature of image field will become difficult and it will become difficult to correct it well.

The condition (6) is important where the refractive power of the second lens group G2 is made strong and a great zoom magnification change ratio is used, and in this case, particularly the correction for spherical aberration is important, and if the lens is constructed so as to satisfy this condition, spherical aberration can be corrected with much better balance.

If the lens is constructed so as to satisfy the condition (7), the achromatizing effect of the cemented portion of the sixth lens component L6 will act more effectively and a good performance will be obtained.

Tables 1 to 4 below show the data of the embodiments of the present invention. Any of the first to fourth embodiments shown in these tables has a lens construction similar to the two-group zoom lens shown in FIG. 1.

In the tables, the leftmost numbers represent the order from the object side, the symbol r represents the radius of curvature of each lens surface, the symbol d represents the spacing between adjacent lens surfaces, the Abbe number and the refractive index n are values for d-line ($\lambda = 587.6$ nm), the third surface is an aspherical surface, the seventh surface is the aperture stop, and the seventeenth surface is the flare stop. The symbol f represents the focal length of the entire system, the symbol $2\omega$ represents the angle of view, the symbol FN represents the F-number, and the symbol $\phi_{L2}$ represents the effective diameter of the second lens component L2.

When the reference radius of curvature is r and the cone constant is k and the nth-order aspherical surface coefficient is An and the vertical height from the optic axis is h, the aspherical shape shown in the tables is shown as follows with x(h) as the distance along the optic axis to the position on the aspherical surface at a height h from the tangential plane at the vertex of the aspherical surface:

$$x(h) = \frac{h^2/r}{1 + \sqrt{1 - kh^2/r^2}} + A_2 h^2 + A_4 h^4 + A_6 h^6 + A_8 h^8 + A_{10} h^{10}$$

and $10^{-n}$ is shown by $E^{-n}$.

TABLE 1

(First Embodiment)
$f = 28.5 \sim 68.5$, FN = $3.60 \sim 4.60$
$2\omega = 76.4 \sim 34.8°$

|  | r | d | Abbe | n |
|---|---|---|---|---|
| 1 | 170.505 | 1.800 | 49.45 | 1.77279 |
| 2 | 22.464 | 5.800 |  |  |
| 3 | 66.081 | 2.000 | 56.41 | 1.50137 |
| 4 | 28.454 | 4.100 |  |  |
| 5 | 34.055 | 5.400 | 31.08 | 1.68893 |
| 6 | 175.461 | (variable) |  |  |
| 7 | ∞ | 0.500 |  |  |
| 8 | 38.533 | 4.000 | 70.41 | 1.48749 |
| 9 | −90.438 | 0.100 |  |  |
| 10 | 29.295 | 3.100 | 70.41 | 1.48749 |
| 11 | 67.165 | 0.100 |  |  |
| 12 | 20.749 | 5.500 | 65.77 | 1.46450 |
| 13 | −79.477 | 7.050 | 33.92 | 1.80384 |
| 14 | 16.202 | 2.500 |  |  |
| 15 | 392.241 | 3.000 | 41.42 | 1.57501 |
| 16 | −35.608 | (variable) |  |  |
| 17 | ∞ | (variable) |  |  |
| f | 28.8000 | 50.0000 | 68.5000 |  |
| d 6 | 41.5241 | 12.6069 | 1.9974 |  |
| d16 | −0.4403 | 3.9997 | 5.9997 |  |
| d17 | 40.5564 | 52.4443 | 64.6927 |  |

3rd surface (aspherical surface)
k = 0.1000E+01
$A_2 = 0$, $A_4 = 0.8008E-05$, $A_6 = 0.5530E-08$
$A_8 = 0.1571E-10$, $A_{10} = 0.5697E-13$
$\phi_{LZ} = 34.11$

TABLE 2

(Second Embodiment)
$f = 28.8 \sim 68.5$, FN = $3.59 \sim 4.60$
$2\omega = 76.2 \sim 34.8°$

|  | r | d | Abbe | n |
|---|---|---|---|---|
| 1 | 217.876 | 1.800 | 49.44 | 1.77279 |
| 2 | 21.586 | 4.200 |  |  |
| 3 | 44.537 | 2.000 | 56.40 | 1.50137 |
| 4 | 25.582 | 4.600 |  |  |
| 5 | 32.900 | 5.400 | 31.07 | 1.68893 |
| 6 | 159.670 | (variable) |  |  |
| 7 | ∞ | 0.750 |  |  |
| 8 | 52.307 | 3.500 | 60.23 | 1.51835 |
| 9 | −148.409 | 0.100 |  |  |
| 10 | 30.298 | 3.300 | 70.45 | 1.48749 |
| 11 | 139.595 | 0.100 |  |  |
| 12 | 21.609 | 5.600 | 70.41 | 1.48749 |
| 13 | −71.975 | 7.000 | 33.92 | 1.80384 |
| 14 | 17.128 | 2.300 |  |  |
| 15 | −262.251 | 2.650 | 41.42 | 1.57501 |
| 16 | −29.016 | (variable) |  |  |
| 17 | ∞ | (variable) |  |  |
| f | 28.8000 | 50.0000 | 68.5000 |  |
| d 6 | 42.5393 | 13.1725 | 2.3981 |  |
| d16 | −0.4000 | 3.5000 | 8.5000 |  |
| d17 | 42.8064 | 55.4884 | 64.9585 |  |

3rd surface (aspherical surface)
k = 0.1000E+01
$A_2 = 0$, $A_4 = 0.1081E-04$, $A_6 = 0.1799E-07$
$A_8 = -0.1437E-10$, $A_{10} = 0.1618E-12$
$\phi_{LZ} = 34.47$

TABLE 3

(Third Embodiment)
f = 28.8~68.0, FN = 3.60~4.59
2ω = 76.4~35.2°

| | r | d | Abbe | n |
|---|---|---|---|---|
| 1 | 155.838 | 1.800 | 49.44 | 1.77279 |
| 2 | 19.821 | 4.900 | | |
| 3 | 38.781 | 2.000 | 56.40 | 1.50137 |
| 4 | 22.728 | 4.400 | | |
| 5 | 30.993 | 5.400 | 31.07 | 1.68893 |
| 6 | 123.147 | (variable) | | |
| 7 | ∞ | 1.000 | | |
| 8 | 45.667 | 4.000 | 55.60 | 1.69680 |
| 9 | −401.126 | 0.100 | | |
| 10 | 34.989 | 3.000 | 82.52 | 1.49782 |
| 11 | 89.594 | 0.100 | | |
| 12 | 23.343 | 6.000 | 69.98 | 1.51860 |
| 13 | −63.582 | 7.150 | 35.72 | 1.90265 |
| 14 | 19.330 | 2.000 | | |
| 15 | −3775.827 | 3.000 | 54.01 | 1.61720 |
| 16 | −28.059 | (variable) | | |
| 17 | ∞ | (variable) | | |
| f | 28.8000 | 50.0000 | 68.0000 | |
| d 6 | 37.0103 | 11.5040 | 2.3319 | |
| d16 | −0.4788 | 7.8712 | 11.2712 | |
| d17 | 44.5985 | 54.3861 | 66.3859 | |

3rd surface (aspherical surface)
k = 0.1000E+01
$A_2 = 0$, $A_4 = 0.1484E-04$, $A_6 = 0.2129E-07$
$A_8 = -0.2238E-10$, $A_{10} = 0.1890E-12$
$\phi_{LZ} = 31.94$

TABLE 4

(Fourth Embodiment)
f = 28.5~68.5, FN = 3.60~4.60
2ω = 76.5~34.8°

| | r | d | Abbe | n |
|---|---|---|---|---|
| 1 | 278.447 | 1.800 | 49.44 | 1.77279 |
| 2 | 21.561 | 4.200 | | |
| 3 | 42.910 | 2.000 | 56.40 | 1.50137 |
| 4 | 25.753 | 4.600 | | |
| 5 | 33.778 | 5.400 | 31.07 | 1.68893 |
| 6 | 187.609 | (variable) | | |
| 7 | ∞ | 0.750 | | |
| 8 | 49.279 | 3.500 | 60.23 | 1.51835 |
| 9 | −165.377 | 0.100 | | |
| 10 | 28.101 | 3.300 | 70.45 | 1.48749 |
| 11 | 134.273 | 0.100 | | |
| 12 | 22.853 | 5.600 | 70.41 | 1.48749 |
| 13 | −68.286 | 7.000 | 33.92 | 1.80384 |
| 14 | 17.064 | 2.300 | | |
| 15 | −326.217 | 2.650 | 41.42 | 1.57501 |
| 16 | −29.744 | (variable) | | |
| 17 | ∞ | (variable) | | |
| f | 28.8000 | 50.0000 | 68.5000 | |
| d 6 | 42.5225 | 13.1557 | 2.3813 | |
| d16 | −0.3500 | 3.5000 | 7.5000 | |
| d17 | 42.5153 | 55.2473 | 65.7174 | |

3rd surface (aspherical surface)
k = .1000E+01
$A_2 = 0$, $A_4 = 0.1133E-04$, $A_6 = 0.2057E-07$
$A_8 = -0.2132E-10$, $A_{10} = 0.1642E-12$
$\phi_{LZ} = 35.15$ Table of Condition-Corresponding Values

| Embodiment | (1) $\frac{|A_s - s| f_1}{f_w f_{L1}}$ | (3) $\frac{f_1}{f_w}$ | (4) $\frac{f_2}{f_w}$ |
|---|---|---|---|
| 1 | 0.054 | −1.753 | 1.351 |
| 2 | 0.095 | −1.753 | 1.372 |
| 3 | 0.086 | −1.563 | 1.337 |
| 4 | 0.113 | −1.753 | 1.372 |

(2)

-continued

Table of Condition-Corresponding Values

| Embodiment | $\frac{f_T}{f_w}$ | (5) $n_{62} - n_{61}$ | (6) $d_{61} < d_{62}$ | (7) $\nu_{61} - \nu_{62}$ |
|---|---|---|---|---|
| 1 | 2.378 | 0.339 | ○ | 31.85 |
| 2 | 2.378 | 0.316 | ○ | 36.49 |
| 3 | 2.361 | 0.384 | ○ | 34.26 |
| 4 | 2.378 | 0.316 | ○ | 36.49 |

The mark ○ in the condition-corresponding values shows that the conditions are satisfied.

Figure 2:
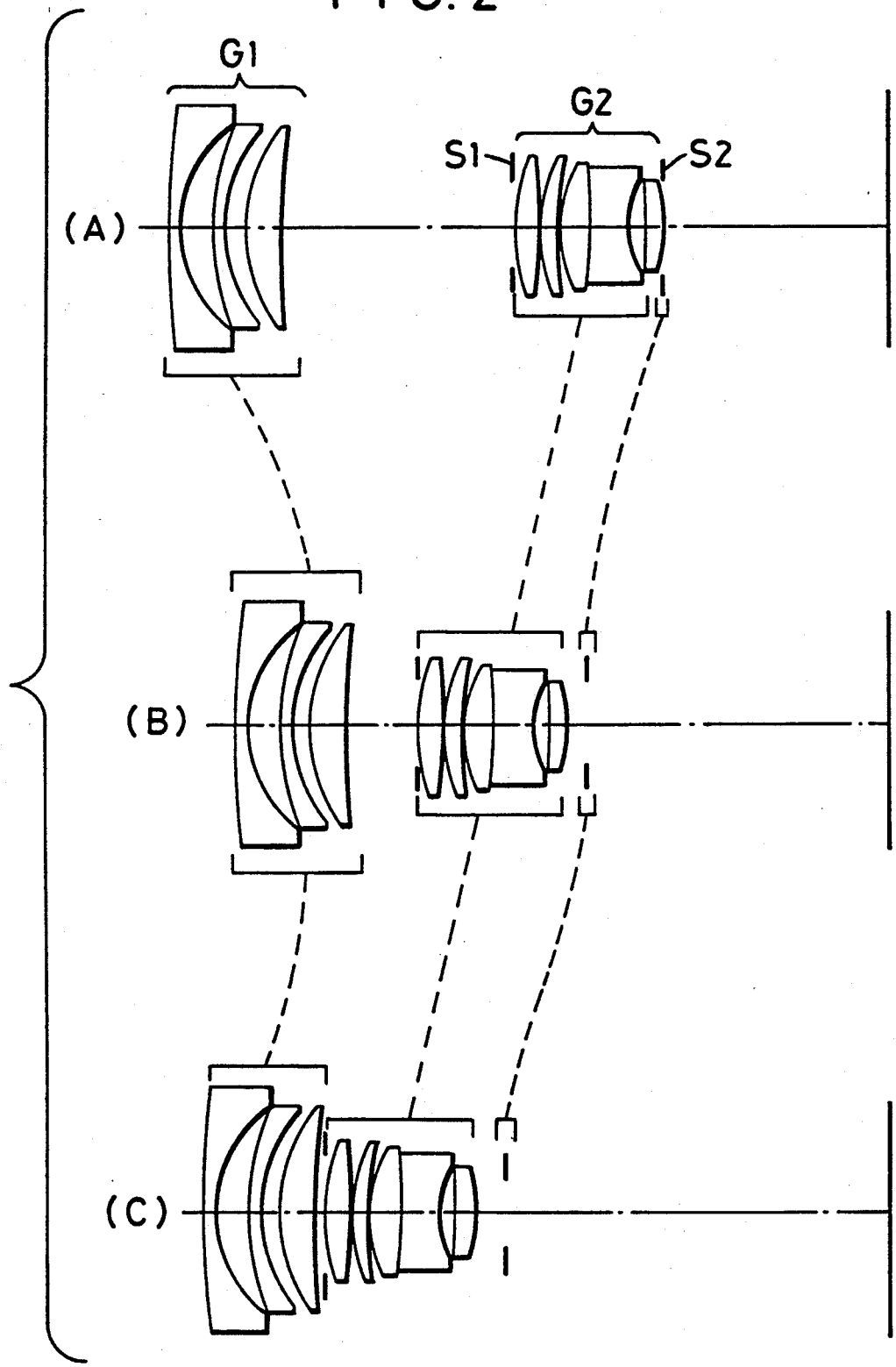
FIG. 2 illustrates the moved state of the optical system during zooming in the embodiment of the present invention shown in FIG. 1.

FIG. 2 is an illustration showing the moved state of the optical system during the zooming in the embodiment of the present invention shown in FIG. 1, and in FIG. 2, (A) shows the shortest focus state (wide angle end), (B) shows the medium focus state, and (C) shows the longest focus state (telephoto end). As is apparent from (A)-(C) of FIG. 2, the aperture stop S1 disposed at the object side of the second lens group G2 is moved with the second lens group G2 with zooming. Also, the flare stop S2 in each embodiment is moved nonlinearly independently of the first lens group G1 and the second lens group G2 with zooming. The diameters φ of the flare stops S2 in the first to fourth embodiments are 14.15, 14.16, 14.50 and 14.36, respectively.

The reason why in each embodiment of the present invention, a glass material very approximate to a plastic material is used for the lens L2 having an aspherical shape is that this lens L2 can be readily replaced with a plastic material to further promote the reduction in the cost. Therefore, this lens L2 may be replaced with a plastic material and the aspherical shape of this lens L2 may be somewhat changed, whereby an effect similar to that of the previously described embodiments can be realized.

As described above, according to the present invention, there can be realized a compact two-group zoom lens in which the differences in color of lower coma on the wide angle side, the fluctuation of lower coma by zooming, the over-corrected flare component of upper coma, etc. are corrected well and spherical aberration, astigmatism and distortion are also corrected and very good balance of aberrations is kept and therefore a marked improvement in the imaging performance can be realized and which is easy to manufacture and can achieve a reduction in the cost and which has a relatively wide angle of view and a high zoom ratio.

What is claimed is:

1. A two-group zoom lens including a first lens group having a negative refractive power, and a second lens group having a positive refractive power, zooming being effected with the spacing between said first lens group and said second lens group being relatively varied, said first lens group comprising, in succession from the object side, a first lens component having a negative refractive power, a second lens component having a negative refractive power and having an aspherical shape in which the negative refractive power becomes weaker toward the marginal portion, and a third lens component having a positive refractive power, said first lens component being the only lens component of said zoom lens between said second lens component and the object side of said zoom lens, said zoom lens satisfying the following condition:

$$0.052 < \frac{|As - s|f_1}{fw \cdot f_{L1}} < 0.2$$

where $|As-s|$ is the difference in the direction of the optic axis between said aspherical surface of said second lens component on the most marginal edge of the effective diameter thereof and a reference spherical surface having a predetermined vertex radius of curvature, $f_1$ is the focal length of said first lens group, fw is the focal length of the entire system at the wide angle end, and $f_{L1}$ is the focal length of said first lens component.

2. A two-group zoom lens according to claim 1, further satisfying the following condition:

$$2.2 \leq fT/fw \leq 2.5$$

where fT is the focal length of the entire system at the telephoto end.

3. A two-group zoom lens according to claim 1, further satisfying the following conditions:

$$-2 \leq f1/fw \leq -1.2 \leq f2/fw \leq 1.5$$

where $f_2$ is the focal length of said second lens group.

4. A two-group zoom lens according to claim 1, further including an aperture stop provided a the object side of said second lens group and a flare stop provided at the image side of said second lens group and having the function of removing a flare component, and wherein in said first lens group, said first lens component and said second lens component each having a negative refractive power and said third lens component having a positive refractive power have a meniscus shape having its convex surface facing the object side, and said second lens group has, in succession from the object side, a fourth lens component and a fifth lens component each having a positive refractive power, a sixth lens component comprising lenses having refractive powers of different signs and cemented together and having its convex surface facing the object side and having a negative refractive power as a whole, and a seventh lens component having its convex surface facing the image side and having a positive refractive power, said aperture stop and said flare stop being designed to be moved relative to each other along the optic axis with zooming.

5. A two-group zoom lens according to claim 4, wherein said sixth lens component satisfies the following conditions:

$$0.23 \leq n_{62} - n_{61} \leq 0.4, d_{61} < d_{62}, 23 \leq \nu_{61} - \nu_{62} \leq 45,$$

where $n_{61}$, $d_{61}$ and $\nu_{61}$ are the refractive index for d-line, the center thickness and the Abbe number, respectively, of a positive lens in said sixth lens component, and $n_{62}$, $d_{62}$ and $\nu_{62}$ are the refractive index for d-line, the center thickness and the Abbe number, respectively, of a negative lens cemented to said positive lens.

6. A two-group zoom lens according to claim 1, constructed in accordance with the following numerical data:

| f = 28.5~68.5, FN = 3.60~4.60 2ω = 76.4~34.8° | | | |
|---|---|---|---|
| r | d | Abbe | n |
| 1 170.505 | 1.800 | 49.45 | 1.77279 |
| 2 22.464 | 5.800 | | |
| 3 66.081 | 2.000 | 56.41 | 1.50137 |
| 4 28.454 | 4.100 | | |
| 5 34.055 | 5.400 | 31.08 | 1.68893 |
| 6 175.461 | (variable) | | |
| 7 ∞ | 0.500 | | |
| 8 38.533 | 4.000 | 70.41 | 1.48749 |
| 9 −90.438 | 0.100 | | |
| 10 29.295 | 3.100 | 70.41 | 1.48749 |
| 11 67.165 | 0.100 | | |
| 12 20.749 | 5.500 | 65.77 | 1.46450 |
| 13 −79.477 | 7.050 | 33.92 | 1.80384 |
| 14 16.202 | 2.500 | | |
| 15 392.241 | 3.000 | 41.42 | 1.57501 |
| 16 −35.608 | (variable) | | |
| 17 ∞ | (variable) | | |
| f 28.8000 | 50.0000 | 68.5000 | |
| d 6 41.5241 | 12.6069 | 1.9974 | |
| d16 −0.4403 | 3.9997 | 5.9997 | |
| d17 40.5564 | 52.4443 | 64.6927 | |

3rd surface (aspherical surface)
k = 0.1000E+01
$A_2 = 0$, $A_4 = 0.8008E-05$, $A_6 = 0.5530E-08$
$A_8 = 0.1571E-10$, $A_{10} = 0.5697E-13$
$\phi_{LZ} = 34.11$ where the leftmost numbers represent the order from the object side, the symbol r represents the radius of curvature of each lens surface, the symbol d represents the spacing between adjacent lens surfaces, the Abbe number and the refractive index n are values for d-line (λ=587.6 nm), the third surface is an aspherical surface, the seventh surface is the aperture stop, the seventeenth surface is the flare stop, the symbol f represents the focal length of the entire system, the symbol 2ω represents the angle of view, the symbol FN represents the F-number, and the symbol $\phi_{L2}$ represents the effective diameter of the second lens component.

7. A two-group zoom lens according to claim 1, constructed in accordance with the following numerical data:

| f = 28.8~68.5, FN = 3.59~4.60 2ω = 76.2~34.8° | | | |
|---|---|---|---|
| r | d | Abbe | n |
| 1 217.876 | 1.800 | 49.44 | 1.77279 |
| 2 21.586 | 4.200 | | |
| 3 44.537 | 2.000 | 56.40 | 1.50137 |
| 4 25.582 | 4.600 | | |
| 5 32.900 | 5.400 | 31.07 | 1.68893 |
| 6 159.670 | (variable) | | |
| 7 ∞ | 0.750 | | |
| 8 52.307 | 3.500 | 60.23 | 1.51835 |
| 9 −148.409 | 0.100 | | |
| 10 30.298 | 3.300 | 70.45 | 1.48749 |
| 11 139.595 | 0.100 | | |
| 12 21.609 | 5.600 | 70.41 | 1.48749 |
| 13 −71.975 | 7.000 | 33.92 | 1.80384 |
| 14 17.128 | 2.300 | | |
| 15 −262.251 | 2.650 | 41.42 | 1.57501 |
| 16 −29.016 | (variable) | | |
| 17 ∞ | (variable) | | |
| f 28.8000 | 50.0000 | 68.5000 | |
| d 6 42.5393 | 13.1725 | 2.3981 | |
| d16 −0.4000 | 3.5000 | 8.5000 | |
| d17 42.8064 | 55.4884 | 64.9585 | |

3rd surface (aspherical surface)
k = 0.1000E+01
$A_2 = 0$, $A_4 = 0.1081E-04$, $A_6 = 0.1799E-07$
$A_8 = -0.1437E-10$, $A_{10} = 0.1618E-12$ -continued

| | f = 28.8~68.5, FN = 3.59~4.60 2ω = 76.2~34.8° | | | |
|---|---|---|---|---|
| | r | d | Abbe | n |
| $\phi_{LZ} = 34.47$ | | | | | where the leftmost numbers represent the order from the object side, the symbol r represents the radius of curvature of each lens surface, the symbol d represents the spacing between adjacent lens surfaces, the Abbe number and the refractive index n are values for d-line (λ=587.6 nm), the third surface is an aspherical surface, the seventh surface is the aperture stop, the seventeenth surface is the flare stop, the symbol f represents the focal length of the entire system, the symbol 2ω represents the angle of view, the symbol FN represents the F-number, and the symbol $\phi_{L2}$ represents the effective diameter of the second lens component.

8. A two-group zoom lens according to claim 1, constructed in accordance with the following numerical data:

| | f = 28.8~68.0, FN = 3.60~4.59 2ω = 76.4~35.2° | | | |
|---|---|---|---|---|
| | r | d | Abbe | n |
| 1 | 155.838 | 1.800 | 49.44 | 1.77279 |
| 2 | 19.821 | 4.900 | | |
| 3 | 38.781 | 2.000 | 56.40 | 1.50137 |
| 4 | 22.728 | 4.400 | | |
| 5 | 30.993 | 5.400 | 31.07 | 1.68893 |
| 6 | 123.147 | (variable) | | |
| 7 | ∞ | 1.000 | | |
| 8 | 45.667 | 4.000 | 55.60 | 1.69680 |
| 9 | −401.126 | 0.100 | | |
| 10 | 34.989 | 3.000 | 82.52 | 1.49782 |
| 11 | 89.594 | 0.100 | | |
| 12 | 23.343 | 6.000 | 69.98 | 1.51860 |
| 13 | −63.582 | 7.150 | 35.72 | 1.90265 |
| 14 | 19.330 | 2.000 | | |
| 15 | −3775.827 | 3.000 | 54.01 | 1.61720 |
| 16 | −28.059 | (variable) | | |
| 17 | ∞ | (variable) | | |
| f | 28.8000 | 50.0000 | 68.0000 | |
| d 6 | 37.0103 | 11.5040 | 2.3319 | |
| d16 | −0.4788 | 7.8712 | 11.2712 | |
| d17 | 44.5985 | 54.3861 | 66.3859 | |

3rd surface (aspherical surface)
k = 0.1000E+01
$A_2 = 0$, $A_4 = 0.1484E-04$, $A_6 = 0.2129E-07$
$A_8 = -0.2238E-10$, $A_{10} = 0.1890E-12$
$\phi_{LZ} = 31.94$ where the leftmost numbers represent the order from the object side, the symbol r represents the radius of curvature of each lens surface, the symbol d represents the spacing between adjacent lens surfaces, the Abbe number and the refractive index n are values for d-line (λ=587.6 nm), the third surface is an aspherical surface, the seventh surface is the aperture stop, the seventeenth surface is the flare stop, the symbol f represents the focal length of the entire system, the symbol 2ω represents the angle of view, the symbol FN represents the F-number, and the symbol $\phi_{L2}$ represents the effective diameter of the second lens component.

9. A two-group zoom lens according to claim 1, constructed in accordance with the following numerical data:

| | f = 28.5~68.5, FN = 3.60~4.60 2ω = 76.5~34.8° | | | |
|---|---|---|---|---|
| | r | d | Abbe | n |
| 1 | 278.447 | 1.800 | 49.44 | 1.77279 |
| 2 | 21.561 | 4.200 | | |
| 3 | 42.910 | 2.000 | 56.40 | 1.50137 |
| 4 | 25.753 | 4.600 | | |
| 5 | 33.778 | 5.400 | 31.07 | 1.68893 |
| 6 | 187.609 | (variable) | | |
| 7 | ∞ | 0.750 | | |
| 8 | 49.279 | 3.500 | 60.23 | 1.51835 |
| 9 | −165.377 | 0.100 | | |
| 10 | 28.101 | 3.300 | 70.45 | 1.48749 |
| 11 | 134.273 | 0.100 | | |
| 12 | 22.853 | 5.600 | 70.41 | 1.48749 |
| 13 | −68.286 | 7.000 | 33.92 | 1.80384 |
| 14 | 17.064 | 2.300 | | |
| 15 | −326.217 | 2.650 | 41.42 | 1.57501 |
| 16 | −29.744 | (variable) | | |
| 17 | ∞ | (variable) | | |
| f | 28.8000 | 50.0000 | 68.5000 | |
| d 6 | 42.5225 | 13.1557 | 2.3813 | |
| d16 | −0.3500 | 3.5000 | 7.5000 | |
| d17 | 42.5153 | 55.2473 | 65.7174 | |

3rd surface (aspherical surface)
k = .1000E+01
$A_2 = 0$, $A_4 = 0.1133E-04$, $A_6 = 0.2057E-07$
$A_8 = -0.2132E-10$, $A_{10} = 0.1642E-12$
$\phi_{LZ} = 35.15$ where the leftmost numbers represent the order from the object side, the symbol r represents the radius of curvature of each lens surface, the symbol d represents the spacing between adjacent lens surfaces, the Abbe number and the refractive index n are values for d-line (λ=587.6 nm), the third surface is an aspherical surface, the seventh surface is the aperture stop, the seventeenth surface is the flare stop, the symbol f represents the focal length of the entire system, the symbol 2ω represents the angle of view, the symbol FN represents the F-number, and the symbol $\phi_{L2}$ represents the effective diameter of the second lens component.

10. A two-group zoom lens including a first lens group having a negative refractive power, and a second lens group having a positive refractive power, zooming being effected with the spacing between said first lens group and said second lens group being relatively varied, said first lens group comprising, in succession from the object side, a first lens component having a negative refractive power, a second lens component having a negative refractive power and having an aspherical shape in which the negative refractive power becomes weaker toward the marginal portion, and a third lens component having a positive refractive power, said zoom lens satisfying the following condition:

$$0.052 < \frac{|As - s| f_1}{fw \cdot f_{L1}} < 0.2$$

where |As−s| is the difference in the direction of the optic axis between said aspherical surface of said second lens component on the most marginal edge of the effective diameter thereof and a reference spherical surface having a predetermined vertex radius of curvature, $f_1$ is the focal length of said first lens group, fw is the focal length of the entire system at the wide angle end, and $f_{L1}$ is the focal length of said first lens component, and said zoom lens also satisfying the following condition:

$2.2 \leq fT/fw \leq 2.5$ where fT is the focal length of the entire system at the telephoto end.

11. A two-group zoom lens including a first lens group having a negative refractive power, and a second lens group having a positive refractive power, zooming being effected with the spacing between said first lens group and said second lens group being relatively varied, said first lens group comprising, in succession from the object side, a first lens component having a negative refractive power, a second lens component having a negative refractive power and having an aspherical shape in which the negative refractive power becomes weaker toward the marginal portion, and a third lens component having a positive refractive power, said zoom lens satisfying the following condition:

$$0.052 < \frac{|As - s| f_1}{fw \cdot f_{L1}} < 0.2$$

where $|As-s|$ is the difference in the direction of the optic axis between said aspherical surface of said second lens component on the most marginal edge of the effective diameter thereof and a reference spherical surface having a predetermined vertex radius of curvature, $f_1$ is the focal length of said first lens group, fw is the focal length of the entire system at the wide angle end, and $f_{L1}$ is the focal length of said first lens component, and said zoom lens also satisfying the following condition:

$-2 \leq f_1/fw \leq -1.2$.

12. A two-group zoom lens including a first lens group having a negative refractive power, and a second lens group having a positive refractive power, zooming being effected with the spacing between said first lens group and said second lens group being relatively varied, said first lens group comprising, in succession from the object side, a first lens component having a negative refractive power, a second lens component having a negative refractive power and having an aspherical shape in which the negative refractive power becomes weaker toward the marginal portion, and a third lens component having a positive refractive power, said zoom lens satisfying the following condition:

$$0.052 < \frac{|As - s| f_1}{fw \cdot f_{L1}} < 0.2$$

where $|As-s|$ is the difference in the direction of the optic axis between said aspherical surface of said second lens component on the most marginal edge of the effective diameter thereof and a reference spherical surface having a predetermined vertex radius of curvature, $f_1$ is the focal length of said first lens group, fw is the focal length of the entire system at the wide angle end, and $f_{L1}$ is the focal length of said first lens component and said zoom lens also satisfying the following condition:

$1.2 \leq f_2/f_w \leq 1.5$ where $f_2$ is the focal length of said second lens group.

13. A two-group zoom lens including a first lens group having a negative refractive power, and a second lens group having a positive refractive power, zooming being effected with the spacing between said first lens group and said second lens group being relatively varied, said first lens group comprising, in succession from the object side, a first lens component having a negative refractive power, a second lens component having a negative refractive power and having an aspherical shape in which the negative refractive power becomes weaker toward the marginal portion, and a third lens component having a positive refractive power, said zoom lens satisfying the following condition:

$$0.052 < \frac{|As - s| f_1}{fw \cdot f_{L1}} < 0.2$$

where $|As-s|$ is the difference in the direction of the optic axis between said aspherical surface of said second lens component on the most marginal edge of the effective diameter thereof and a reference spherical surface having a predetermined vertex radius of curvature, $f_1$ is the focal length of said first lens group, fw is the focal length of the entire system at the wide angle end, and $f_{L1}$ is the focal length of said first lens component, said zoom lens further including an aperture stop provided at the object side of said second lens group and a flare stop provided at the image side of said second lens group and having the function of removing a flare component, and wherein in said first lens group, said first lens component and said second lens component each having a negative refractive power and said third lens component having a positive refractive power have a meniscus shape having its convex surface facing the object side, and said second lens group has, in succession from the object side, a fourth lens component and a fifth lens component each having a positive refractive power, a sixth lens component comprising lenses having refractive powers of different signs and cemented together and having its convex surface facing the object side and having a negative refractive power as a whole, and a seventh lens component having its convex surface facing the image side and having a positive refractive power, said aperture stop and said flare stop being designed to be moved relative to each other along the optic axis with zooming.

14. A two-group zoom lens according to claim 13, wherein said sixth lens component satisfies the following conditions:

$0.23 \leq n_{62} - n_{61} \leq 0.4$, $d_{61} < d_{62}$, $23 \nu_{61} - \nu_{62} \leq 45$, where $n_{61}$, $d_{61}$ ar the refractive index for d-line, the center thickness and the Abbe number, respectively, of a positive lens in said sixth lens component, and $n_{62}$, $d_{62}$ and $\nu_{62}$ are the refractive index for d-line, the center thickness and the Abbe number, respectively, of a negative lens cemented to said positive lens.

15. A two-group zoom lens according to claim 13, constructed in accordance with the following numerical data:

| f = 28.5~68.5, FN = 3.60~4.60 2ω = 76.4~34.8° | | | |
|---|---|---|---|
| r | d | Abbe | n |
| 1 170.505 | 1.800 | 49.45 | 1.77279 |
| 2 22.464 | 5.800 | | |
| 3 66.081 | 2.000 | 56.41 | 1.50137 |
| 4 28.454 | 4.100 | | |
| 5 34.055 | 5.400 | 31.08 | 1.68893 |
| 6 175.461 | (variable) | | |
| 7 ∞ | 0.500 | | |
| 8 38.533 | 4.000 | 70.41 | 1.48749 |
| 9 −90.438 | 0.100 | | |

-continued

| | | | | |
|---|---|---|---|---|
| 10 | 29.295 | 3.100 | 70.41 | 1.48749 |
| 11 | 67.165 | 0.100 | | |
| 12 | 20.749 | 5.500 | 65.77 | 1.46450 |
| 13 | −79.477 | 7.050 | 33.92 | 1.80384 |
| 14 | 16.202 | 2.500 | | |
| 15 | 392.241 | 3.000 | 41.42 | 1.57501 |
| 16 | −35.608 | (variable) | | |
| 17 | ∞ | (variable) | | |
| f | 28.8000 | 50.0000 | 68.5000 | |
| d6 | 41.5241 | 12.6069 | 1.9974 | |
| d16 | −0.4403 | 3.9997 | 5.9997 | |
| d17 | 40.5564 | 52.4443 | 64.6927 | |

3rd surface (aspherical surface)

$k = 0.1000E + 01$
$A_Z = 0, A_4 = 0.80008E - 05, A_6 = 0.5530E - 08$
$A_8 = 0.1571E - 10, A_{10} = 0.5697E - 13$
$\phi_{LZ} = 34.11$ where the leftmost numbers represent the order from the object side, the symbol r represents the radius of curvature of each lens surface, the symbol d represents the spacing between adjacent lens surfaces, the Abbe number and the refractive index n are values for d-line (λ=587.6 nm), the third surface is an aspherical surface, the seventh surface is the aperture stop, the seventeenth surface is the flare stop, the symbol f represents the focal length of the entire system, the symbol 2ω represents the angle of view, the symbol FN represents the F-number, and the symbol $\phi_{L2}$ represents the effective diameter of the second lens component.

16. A two-group zoom lens according to claim 13, constructed in accordance with the following numerical data:

f = 28.8~68.5, FN = 3.59~4.60
2ω = 76.2~34.8°

| | r | d | Abbe | n |
|---|---|---|---|---|
| 1 | 217.876 | 1.800 | 49.44 | 1.77279 |
| 2 | 21.586 | 4.200 | | |
| 3 | 44.537 | 2.000 | 56.40 | 1.50137 |
| 4 | 25.582 | 4.600 | | |
| 5 | 32.900 | 5.400 | 31.07 | 1.68893 |
| 6 | 159.670 | (variable) | | |
| 7 | ∞ | 0.750 | | |
| 8 | 52.307 | 3.500 | 60.23 | 1.51835 |
| 9 | −148.409 | 0.100 | | |
| 10 | 30.298 | 3.300 | 70.45 | 1.48749 |
| 11 | 139.595 | 0.100 | | |
| 12 | 21.609 | 5.600 | 70.41 | 1.48749 |
| 13 | −71.975 | 7.000 | 33.92 | 1.80384 |
| 14 | 17.128 | 2.300 | | |
| 15 | −262.251 | 2.650 | 41.42 | 1.57501 |
| 16 | −29.016 | (variable) | | |
| 17 | ∞ | (variable) | | |
| f | 28.8000 | 50.0000 | 68.5000 | |
| d6 | 42.5393 | 13.1725 | 2.3981 | |
| d16 | −0.4000 | 3.5000 | 8.5000 | |
| d17 | 42.8064 | 55.4884 | 64.9585 | |

3rd surface (aspherical surface)

$k = 0.1000E + 01$
$A_Z = 0, A_4 = 1081E - 04, A_6 = 0.1799E - 07$
$A_8 = -0.1437E - 10, A_{10} = 1618E - 12$
$\phi_{LZ} = 34.47$ where the leftmost numbers represent the order from the object side, the symbol r represents the radius of curvature of each lens surface, the symbol d represents the spacing between adjacent lens surfaces, the Abbe number and the refractive index n are values for d-line (λ=587.6 nm), the third surface is an aspherical surface, the seventh surface is the aperture stop, the seventeenth surface is the flare stop, the symbol f represents the focal length of the entire system, the symbol 2ω represents the angle of view, the symbol FN represents the F-number, and the symbol $\phi_{L2}$ represents the effective diameter of the second lens component.

17. A two-group zoom lens according to claim 13, constructed in accordance with the following numerical data:

f = 28.8~68.0, FN = 3.60~4.59
2ω = 76.4~35.2°

| | r | d | Abbe | n |
|---|---|---|---|---|
| 1 | 155.838 | 1.800 | 49.44 | 1.77279 |
| 2 | 19.821 | 4.900 | | |
| 3 | 38.781 | 2.000 | 56.40 | 1.50137 |
| 4 | 22.728 | 4.400 | | |
| 5 | 30.993 | 5.400 | 31.07 | 1.68893 |
| 6 | 123.147 | (variable) | | |
| 7 | ∞ | 1.000 | | |
| 8 | 45.667 | 4.000 | 55.60 | 1.69680 |
| 9 | −401.126 | 0.100 | | |
| 10 | 34.989 | 3.000 | 82.52 | 1.49782 |
| 11 | 89.594 | 0.100 | | |
| 12 | 23.343 | 6.000 | 69.98 | 1.51860 |
| 13 | −63.582 | 7.150 | 35.72 | 1.90265 |
| 14 | 19.330 | 2.000 | | |
| 15 | −3775.827 | 3.000 | 54.01 | 1.61720 |
| 16 | −28.059 | (variable) | | |
| 17 | ∞ | (variable) | | |
| f | 28.8000 | 50.0000 | 68.0000 | |
| d6 | 37.0103 | 11.5040 | 2.3319 | |
| d16 | −0.4788 | 7.8712 | 11.2712 | |
| d17 | 44.5985 | 54.3861 | 66.3859 | |

3rd surface (aspherical surface)

$k = 0.1000E + 01$
$A_Z = 0, A_4 \, 0.1484E - 0.4, A_6 = 0.2129E - 07$
$A_8 = 0.2238E - 10, A_{10} = 0.1890E - 12$
$\phi_{LZ} = 31.94$ where the leftmost numbers represent the order from the object side, the symbol r represents the radius of curvature of each lens surface, the symbol d represents the spacing between adjacent lens surfaces, the Abbe number and the refractive index n are values for d-line (λ=587.6 nm), the third surface is an aspherical surface, the seventh surface is the aperture stop, the seventeenth surface is the flare stop, the symbol f represents the focal length of the entire system, the symbol 2ω represents the angle of view, the symbol FN represents the F-number, and the symbol $\phi_{L2}$ represents the effective diameter of the second lens component.

18. A two-group zoom lens according to claim 13, constructed in accordance with the following numerical data:

f = 28.5~68.5, FN = 3.60~4.60
2ω = 76.5~34.8°

| | r | d | Abbe | n |
|---|---|---|---|---|
| 1 | 278.447 | 1.800 | 49.44 | 1.77279 |
| 2 | 21.561 | 4.200 | | |
| 3 | 42.910 | 2.000 | 56.40 | 1.50137 |
| 4 | 25.753 | 4.600 | | |
| 5 | 33.778 | 5.400 | 31.07 | 1.68893 |
| 6 | 187.609 | (variable) | | |
| 7 | ∞ | 0.750 | | |
| 8 | 49.279 | 3.500 | 60.23 | 1.51835 |
| 9 | −165.377 | 0.100 | | |
| 10 | 28.101 | 3.300 | 70.45 | 1.48749 |
| 11 | 134.273 | 0.100 | | |
| 12 | 22.853 | 5.600 | 70.41 | 1.48749 |

-continued

| | | | | |
|---|---|---|---|---|
| 13 | −68.286 | 7.000 | 33.92 | 1.80384 |
| 14 | 17.064 | 2.300 | | |
| 15 | −326.217 | 2.650 | 41.42 | 1.57501 |
| 16 | −29.744 | (variable) | | |
| 17 | ∞ | (variable) | | |
| f | 28.8000 | 50.0000 | 68.5000 | |
| d6 | 42.5225 | 13.1557 | 2.3813 | |
| d16 | −0.3500 | 3.5000 | 7.5000 | |
| d17 | 42.5153 | 55.2473 | 65.7174 | |

3rd suface (aspherical surface)

$k = .1000E + 01$ $A_2 = 0, A_4 = 0.1133E - 04, A_6 = 0.2057E + 07$ $A_8 = 0.2132E - 10, A_{10} = 0.1642E - 12$

-continued $\phi_{LZ} = 35.15$ where the leftmost numbers represent the order from the object side, the symbol r represents the radius of curvature of each lens surface, the symbol d represents the spacing between adjacent lens surfaces, the Abbe number and the refractive index n are values for d-line ($\lambda = 587.6$ nm), the third surface is an aspherical surface, the seventh surface is the aperture stop, the seventeenth surface is the flare stop, the symbol f represents the focal length of the entire system, the symbol $2\omega$ represents the angle of view, the symbol FN represents the F-number, and the symbol $\phi_{L2}$ represents the effective diameter of the second lens component.

* * * * *